(12) United States Patent
Rustad (10) Patent No.: US 6,886,063 B1
(45) Date of Patent: Apr. 26, 2005

(54) SYSTEMS, DEVICES, STRUCTURES, AND METHODS TO SHARE RESOURCES AMONG ENTITIES

(75) Inventor: Mark D. Rustad, Edina, MN (US)

(73) Assignee: Digi International, Inc., Minnetonka, MN (US)

( * ) Notice: Subject to any disclaimer, the term of this patent is extended or adjusted under 35 U.S.C. 154(b) by 0 days.

(21) Appl. No.: 09/437,169

(22) Filed: Nov. 10, 1999

(51) Int. Cl.⁷ .............................................. G06F 12/14
(52) U.S. Cl. ...................... 710/200; 710/240; 710/241; 710/116; 710/305; 710/107; 710/108; 710/15; 711/135; 711/169
(58) Field of Search ................................ 710/200, 240, 710/241, 116, 305, 107, 108, 15, 110, 244; 711/135, 169, 146, 137; 365/49; 455/456

(56) References Cited

U.S. PATENT DOCUMENTS

| | | | | |
|---|---|---|---|---|
| 3,845,474 A | * | 10/1974 | Lange et al. ................... | 365/49 |
| 3,979,726 A | * | 9/1976 | Lange et al. ................. | 711/135 |
| 4,035,777 A | * | 7/1977 | Moreton ...................... | 710/305 |
| 4,151,592 A | * | 4/1979 | Suzuki et al. ................ | 710/116 |
| 4,633,394 A | * | 12/1986 | Georgiou et al. ............ | 710/240 |
| 4,774,625 A | * | 9/1988 | Yamanaka ................... | 710/110 |
| 5,025,365 A | * | 6/1991 | Mathur et al. ............... | 711/121 |
| 5,202,972 A | * | 4/1993 | Gusefski et al. ............. | 711/123 |
| 5,313,591 A | * | 5/1994 | Averill ........................ | 710/119 |
| 5,365,526 A | * | 11/1994 | Wu .............................. | 710/15 |
| 5,446,844 A | * | 8/1995 | Steckler et al. .............. | 711/118 |
| 5,524,254 A | * | 6/1996 | Morgan et al. ............... | 709/245 |
| 5,581,734 A | * | 12/1996 | DiBrino et al. .............. | 711/169 |
| 5,613,153 A | | 3/1997 | Arimilli et al. .............. | 395/821 |
| 5,623,670 A | * | 4/1997 | Bohannon et al. ........... | 710/200 |
| 5,694,575 A | | 12/1997 | Oba et al. .................... | 395/473 |
| 5,737,545 A | * | 4/1998 | Wszolek et al. ............. | 710/108 |
| 6,006,303 A | * | 12/1999 | Barnaby et al. ............. | 710/244 |
| 6,078,982 A | * | 6/2000 | Du et al. ..................... | 710/200 |
| 6,105,099 A | * | 8/2000 | Freitas et al. ................ | 710/200 |
| 6,330,645 B1 | * | 12/2001 | Harriman ..................... | 711/151 |
| 6,415,364 B1 | * | 7/2002 | Bauman et al. .............. | 711/155 |
| 6,546,443 B1 | * | 4/2003 | Kakivaya et al. ........... | 710/200 |
| 6,571,325 B1 | * | 5/2003 | Satagopan et al. .......... | 711/169 |
| 6,633,938 B1 | * | 10/2003 | Rowlands et al. ........... | 710/240 |
| 6,766,397 B2 | * | 7/2004 | O'Hare et al. ............... | 710/200 |
| 6,779,090 B2 | * | 8/2004 | McKenney et al. ......... | 711/152 |

FOREIGN PATENT DOCUMENTS

EP          0563621          10/1993          ........... G06F/11/00

OTHER PUBLICATIONS

The Authoritative Dictionary of IEEE Standards Terms, Standards Information Network IEEE Press, 7th ed., pp. 100, 157.*

The Computer Language Company, TechEncyclopedia's definition for class, http://ww.techweb.com/encyclopedia/defineterm?term=class.*

(Continued)

*Primary Examiner*—Xuan M. Thai
*Assistant Examiner*—Justin King
(74) *Attorney, Agent, or Firm*—Schwegman, Lundberg, Woessner & Kluth, P.A.

(57) ABSTRACT

Systems, devices, structures, and methods are provided to allow resources to be shared among a plurality of processors. An exemplary system includes a mechanism to grant exclusive control of a resource to a processor, while at the same time, the fast memory of such a processor is maintained in a coherent state. An exemplary structure includes data structures that help to identify the portion of the fast memory of the processor to be maintained in a coherent state. An exemplary method includes a determination of past and present processors that have had access to the resource so as to maintain the coherency of the fast memory of the processor.

57 Claims, 6 Drawing Sheets

OTHER PUBLICATIONS

James Peterson, Abraham Silberschatz, Operating System Concept, 1985, Addison Westley, 2nd Ed., p. 5.*

Andrew Tanenbaum, Structured Computer Organization, 1984, Prentice–Hall, Inc., 3rd Ed., pp. 11–13.*

Morris, John, DiKstra's Algorithm, 1998, http://ciips.ee.uwa.au/~morris/year2/plds210/dijkstra.html.*

Patterson, David, Snooping vs. Directory Based Coherency, U. C. Berkerly, 1996.*

M. Morris Mano, Computer System Architecture, Englewood Cliffs, N.J., 2nd Edition, pp 454–462.*

"MC68030 Enhanced 32–Bit Microprocessor User's Manual, 3rd Edition", Section 6, *Published by Motorola*, (1992).

"PowerPC 601 RISC Microprocessor User's Manual", Chapter 4; Sections 4.7.2 through 4.7.9, *Available from IBM and Motorola*.

"TinyRISC TR4101 Building Blocks Technical Manual", Published by LSI Logic, (Jan. 2000).

"TinyRISC TR4101 Microprocessor Core Technical Manual", Published by LSI Logic, (Dec. 1999).

Tanenbaum, Andrew S., "Operating Systems: Design and Implementation", *Section 2.2.3: Mutual Exclusion with Busy Waiting*, Prentice–Hall, Inc., Englewood Cliffs, New Jersey, pp. 53–57, (1987).

* cited by examiner

FIG. 6

SYSTEMS, DEVICES, STRUCTURES, AND METHODS TO SHARE RESOURCES AMONG ENTITIES

TECHNICAL FIELD

The present invention relates generally to computer systems. More particularly, it pertains to sharing resources among a plurality of entities in computer systems.

BACKGROUND INFORMATION

The information technology of today has grown at an unprecedented rate as a result of the synergistic marriage of communication networks and the computer. Milestones in the development of these communication networks have included the telephone networks, radio, television, cable, and communication satellites. Computers have made tremendous progress from being a single, hulking machine operated by a human operator to today's postage-stamp-size integrated circuits. The merging of the communication networks and the computer has replaced the model of forcing workers to bring their work to the machine to a model of allowing anyone to access information on any computers at diverse locations and times.

Certain barriers exist for the continuing advancement of communication networks. Communication networks have leveraged from the powerful processing capability of a single computer processor. To increase processing throughput, multiple processors may be engaged in a parallel architecture. Whereas a single processor may access resources for processing in an orderly manner, each processor in a multiple-processor environment competes with the others for access to resources to complete its own processing workload. In this environment, a resource can be changed or altered by any of the processors. Such changes by a processor, thus, could adversely affect the operation of other processors that are not privy to the change made by the controlling processor.

Thus, systems, devices, structures, and methods are needed to allow resources to be shared in a multiple-processor environment.

SUMMARY

The above-mentioned problems with sharing resources in a multiple-processor environment as well as other problems are addressed by the present invention and will be understood by reading and studying the following specification. Systems, devices, structures, and methods are described which allow resources to be shared in a multiple-processor environment.

In particular, an illustrative embodiment includes an exemplary system. This system includes a bus and a number of entities connected to the bus. At least one entity among the number of entities includes a memory. The system further includes a resource. At least a portion of the memory of one entity is selectively reset when the entity has access to the resource. For example, the memory of one entity is not reset if the entity is the same entity that previously controlled the shared resource.

Another illustrative embodiment includes an exemplary data structure in a machine-readable medium for allowing at least one resource to be shared in a multiple-processor environment, each processor in the multiple-processor environment including a fast memory. The data structure comprises a state for indicating that the resource is under control, and an identifier for identifying a past processor that had exclusive control of the resource.

A further illustrative embodiment includes an exemplary method for synchronizing access to at least one resource in a multiple-processor environment. The method comprises obtaining access to the at beast one resource from a requesting processor, the requesting processor including a cache memory; excluding access to the resource except for the requesting processor; and resetting at least a portion of the cache memory of the requesting processor.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

In the following detailed description of the invention, reference is made to the accompanying drawings that form a part hereof, and in which are shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

Figure 1:
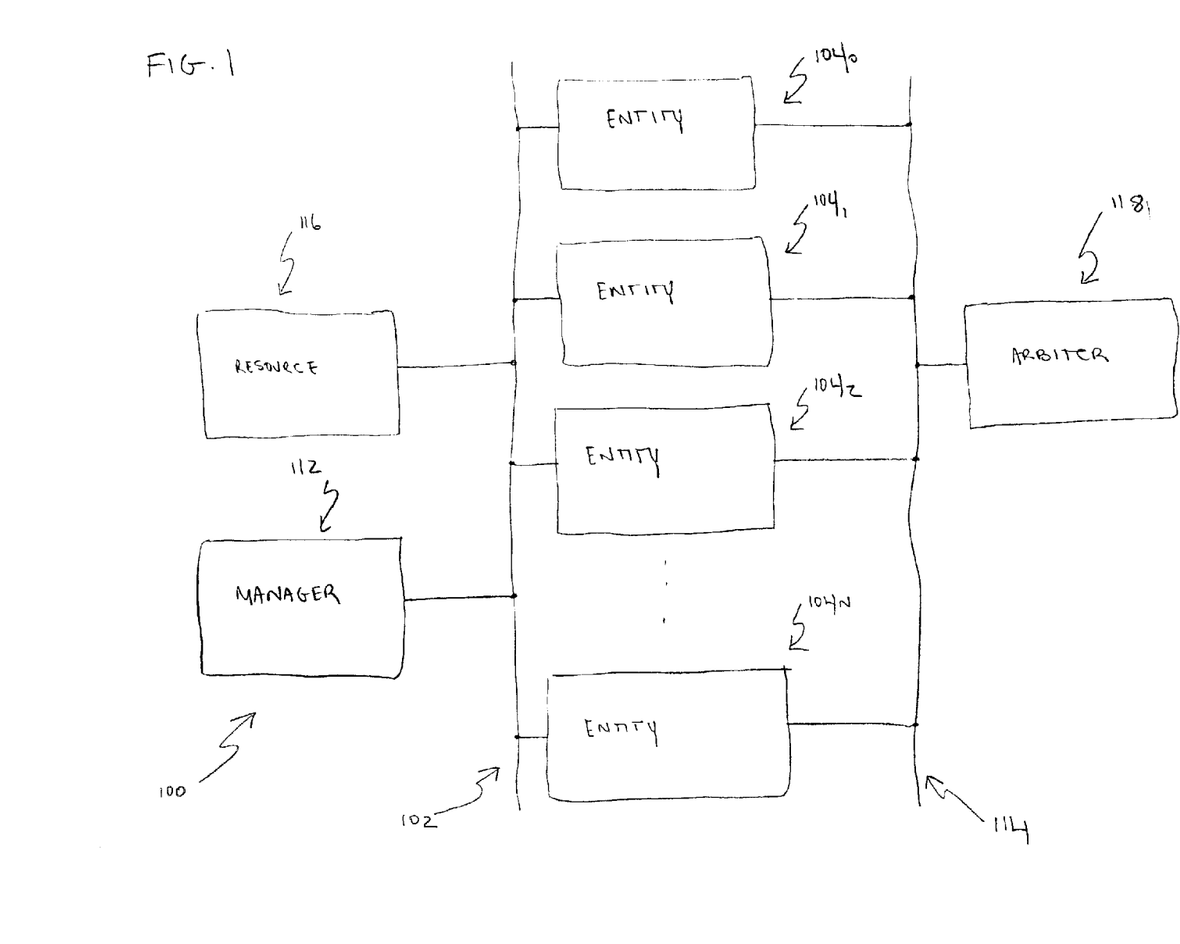
FIG. 1 is a block diagram illustrating a system in accordance with one embodiment.

FIG. 1 is a block diagram illustrating a system in accordance with one embodiment. The system 100 includes a communication medium 102. In one embodiment, the communication medium 102 is a bus. In another embodiment, the communication medium 102 is a network.

This communication medium 102 allows data, address and controls to be communicated among manager 112, resource 116, and entities $104_0$, $104_1$, $104_2$, ..., and $104_N$. In one embodiment, at least one entity, among entities $104_0$, $104_1$, $104_2$, ..., and $104_N$ is an integrated circuit. In one embodiment, these entities $104_0$, $104_1$, $104_2$, ..., and $104_N$ may be optionally connected to an arbiter 118 through a connection medium 114; the arbiter 118 arbitrates bus requests.

Each entity $104_0$, $104_1$, $104_2$, ..., and $104_N$ independently may need to access resource 116 to accomplish its workload. To access resource 116, each entity $104_0$, $104_1$, $104_2$, ..., and $104_N$ obtains authorization from the manager 112. Manager 112 decides which particular entity has the authorization to access the resource 116. In one embodiment, once the entity that has access to the resource 116 has accomplished its task involving the resource 116, the entity notifies the manager 112 to free up the resource 116 for other entities to use. In another embodiment, the manager 112 determines if the entity that has access to resource 116 no longer needs to use the resource 116; in this case, the manager 112 frees up the resource 116 and makes it available for other entities to access.

In one embodiment, the decision to grant authorization to the resource 116 is based on an algorithm. In another embodiment, the decision to grant authorization to the resource 116 is based on the priority of the workload. In another embodiment, the decision to grant authorization to the resource 116 is based upon the earliest request by an entity to access resource 116. In yet another embodiment, the decision to grant authorization to the resource 116 is done in a round-robin fashion.

The manager 112, in one embodiment, is a software application such as a resource scheduler. In another embodiment, the manager 112 is an integrated circuit.

Figure 2:
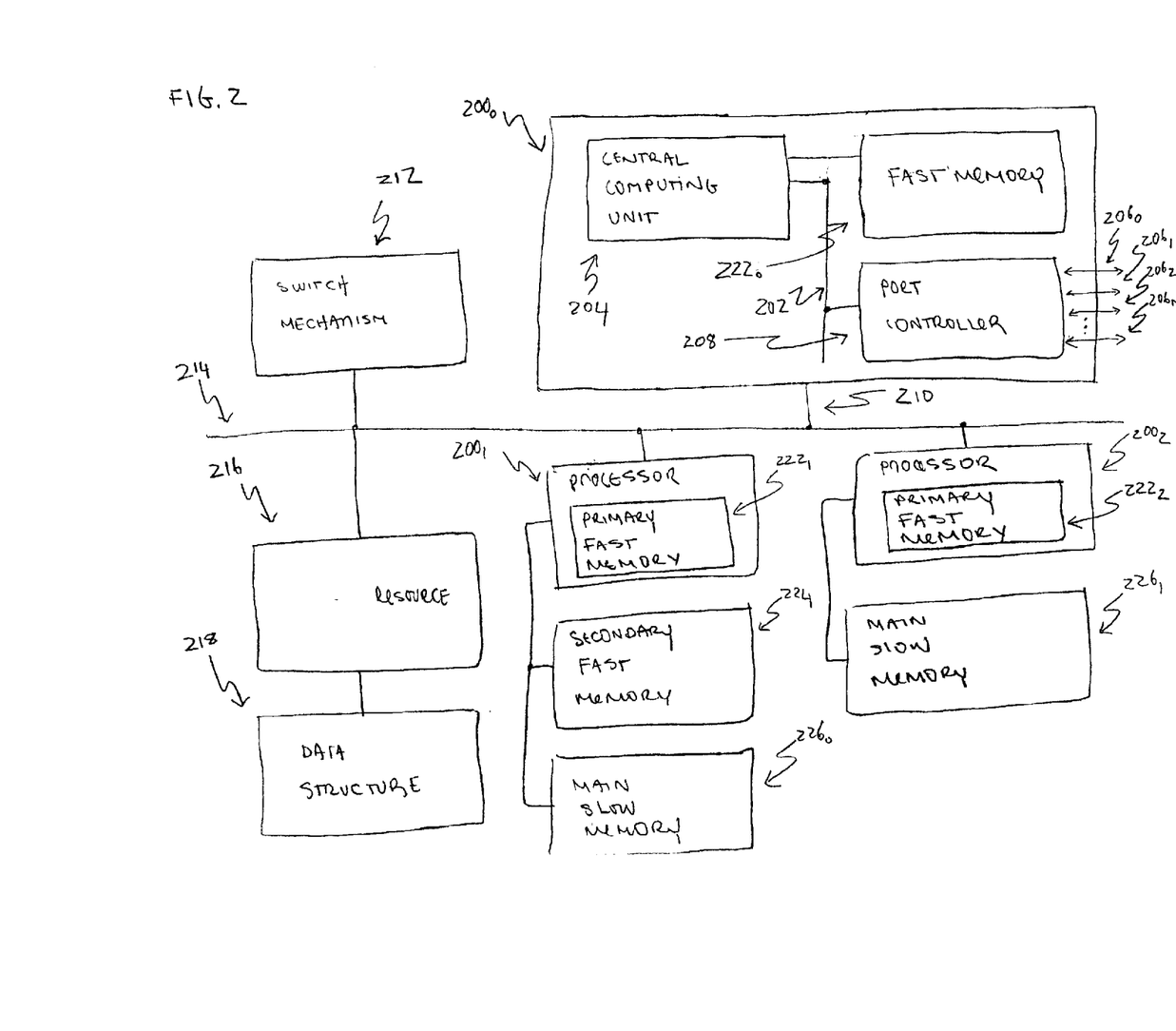
FIG. 2 is a block diagram illustrating a system in accordance with one embodiment.

FIG. 2 is a block diagram illustrating a system in accordance with one embodiment. Integrated circuit 200, includes an internal bus 202. The internal bus 202 allows data and controls to be routed to and from central computing unit 204, and port controller 208.

The central computing unit 204 can access fast memory $222_0$. In one embodiment, fast memory $222_0$, is primary cache memory.

The port controller (or communications channel controller) 208 is receptive to communication channels $206_0, 206_1, 206_2, \ldots, 206_N$. In one embodiment at least one of these communication channels supports an asynchronous protocol. In another embodiment at least one of these communication channels supports a synchronous protocol. In another embodiment at least one of these communication channels can support either an asynchronous or a synchronous protocol. In another embodiment at least one of these communication channels supports an Asynchronous Transfer Mode (ATM) protocol. In another embodiment at least one of these communication channels supports an asymmetric digital subscriber line (ADSL) ATM protocol. In another embodiment at least one of these communication channels supports a High Level Data Link Control (HDLC) protocol. In yet another embodiment at least one of these communication channels supports transparent mode protocol. In a further embodiment, at least each of the cited protocols is controllable contemporaneously.

The port controller 208 manages data from communication channels $206_0, 206_1, 206_2, \ldots, 206_N$ before the data is made available to the rest of integrated circuit $200_0$ for further processing. The port controller 208 communicates the data from communication channels $206_0, 206_1, 206_2, \ldots, 206_N$ through the internal bus 202. The port controller 208, in one embodiment, includes local area network (LAN) support. In another embodiment, the port controller 208 includes metropolitan area network (MAN) support. In yet another embodiment, the port controller 208 includes wide area network (WAN) support. In a further embodiment, the port controller 208 includes Internet support.

Interface 210 coordinates data and controls from the integrated circuit 200, to the bus 214. When the integrated circuit 200, requires access to a resource outside of the integrated circuit $200_0$, the integrated circuit $200_0$ communicates with the interface 210 to establish access. When the integrated circuit $200_0$ is providing data to a requesting client outside of the integrated circuit $200_0$, the integrated circuit $200_0$ communicates with the interface 210 to push the data to the requesting client. For illustrative purposes, the requesting client may be processor $200_1$.

The bus 214 allows data and controls to be routed to and from integrated circuit $200_0$, a resource 216, a processor $200_1$, and a processor $200_2$. In one embodiment, the resource 216 is a random access memory, such as synchronous dynamic random access memory (SDRAM). In another embodiment, the resource 216 is a memory device, such as a hard disk. In another embodiment, the resource 216 is a modifiable data source containing a data structure 218. In yet another embodiment, the resource 216 is a writable CD-ROM. In a further embodiment, the resource 216 is a computer, such as a server.

In one embodiment, the processor $200_1$ includes the architecture of the integrated circuit $200_0$. The processor $200_1$ includes a primary fast memory $222_1$. The primary fast memory $222_1$ stores computer instructions and data before they are loaded into the processor $200_1$ for processing. Processor $200_1$ accesses the primary fast memory $222_1$ for instructions and data that are needed repeatedly for program execution. The time for access to instructions and data in the primary fast memory $222_1$ is shorter in comparison to the instructions and data store in secondary fast memory 224 and main memory $226_0$. In one embodiment, the primary fast memory $222_1$ includes cache memory.

Processor $200_2$ may be similar to processor $200_1$ described above. Processor $200_2$ also contains primary fast memory $222_2$. In one embodiment, processor $200_2$ does not have secondary fast memory; instead, processor $200_2$ is coupled directly to the main memory $226_1$.

The switching mechanism 212 indicates whether the resource 216 is available for use. In one embodiment, the switching mechanism may be a component of the integrated circuit $200_0$; in this embodiment, the switching mechanism is coupled to the central computing unit 204. In another embodiment, the switch mechanism may be a part of the arbiter 118 of FIG. 1.

For illustrative purposes, suppose the processor $200_1$ needs to access the resource 216 to use a portion of the resource 216. In one embodiment, the resource 216 may be a memory device. In one embodiment, the portion of resource 216 is the data structure 218. The processor $200_1$ communicates with the switching mechanism 212 through the bus 214. The processor $200_1$ requests the switching mechanism 212 to have access to the resource 216. If the switching mechanism 212 determines that the resource 216 is available for access, it switches control of the resource 216 to the processor $200_1$. While the processor $200_1$ has access to the resource 216, the switching mechanism 212 denies access to other processors that request access to the resource 216, such as processor $200_2$.

At least a portion of the fast memory $222_1$ may be reset when the processor $200_1$ has access to the resource 216. For illustrative purposes only, suppose the processor $200_1$ uses the data structure 218 repeatedly, the fast memory $222_1$ stores a copy of at least a portion of the data structure 218. This will enable the processor $200_1$ to spend more of its time processing since attempting to access the data structure 218 through bus 214 and resource 216 is slower than accessing a copy of the data structure through the fast memory $222_1$. Once the processor $200_1$ no longer needs to use the data structure 218, it informs the switching mechanism 212.

For further illustrative purposes, suppose the processor $200_2$ requests access to the resource 216 to use the data structure 218. Since the resource 216 is available, the processor $200_2$ obtains access to the data structure 218. A portion of the primary fast memory $222_2$ of processor $200_2$ is selectively reset. In one embodiment, it is understood that selectively resetting means to reset every time. Yet, in another embodiment, it is understood that selectively resetting means to reset if a certain condition is satisfied; one condition, for example, may include instances where a different processor than processor $200_2$ had exclusive use of the resource 216. Processor $200_2$ then makes changes to the data structure 218. Once the processor $200_2$ no longer needs the data structure 218, it informs the switching mechanism 212.

Next, for further illustrative purposes, suppose the processor $200_1$ again requests access to the resource 216 to use the data structure 218. Processor $200_1$ is granted access since no other processor is using the data structure 218. Processor $200_1$ then proceeds to access the data structure 218. But it has a ropy of at least a portion of the data structure 218 in its primary fast memory $222_1$ already. However, this copy of the portion of the data structure 218 may not be the same as the portion of the data structure 218 in resource 216. The portion of the data structure 218 in resource 216 may have been changed previously by processor $200_2$.

In one embodiment, at least a portion of the fast memory $222_1$ is reset so that the processor $200_1$, instead of using the copy of the portion of the data structure 218 in its primary fast memory $222_1$, would have to again access the portion of the data structure 218 from resource 216. In another embodiment, all of the fast memory $222_1$ is reset. In one embodiment, the fast memory $222_1$ is reset if another processor had access to the fast memory $222_1$ since the last time processor $200_1$ had access to the fast memory $222_1$.

In one embodiment, the switching mechanism 212 is a hardware device, such as a register. In another embodiment, the switching mechanism 212 is a software switch. In another embodiment, the switching mechanism 212 is a Djikstra primitive. In yet another embodiment, the switching mechanism 212 may reset at least a portion of the fast memory $222_1$ upon granting access. In a further embodiment, the switching mechanism 212 may reset all of the fast memory 222, upon granting access.

Figure 3:
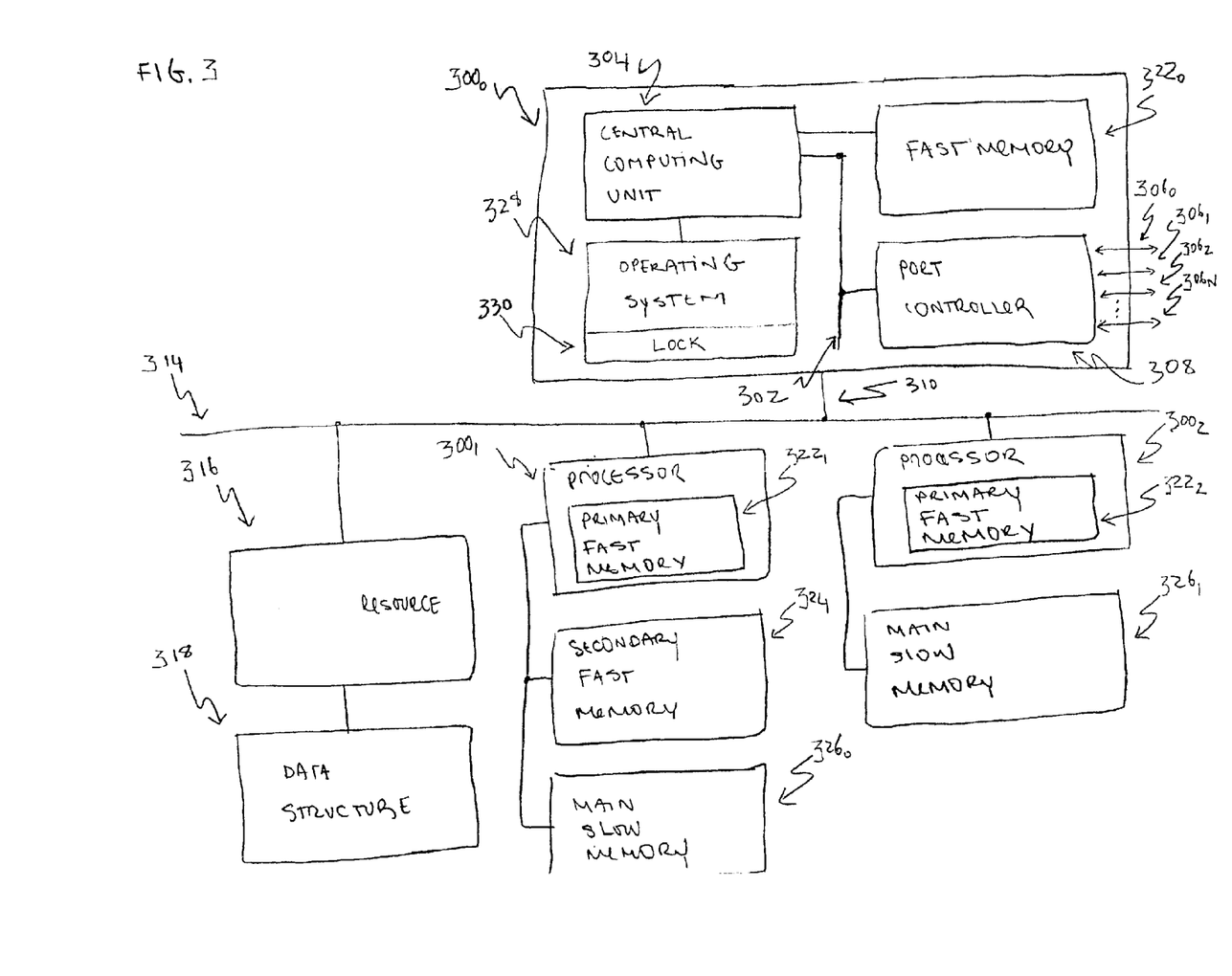
FIG. 3 is a block diagram illustrating a system in accordance with one embodiment.

FIG. 3 is a block diagram illustrating a system in accordance with one embodiment. FIG. 3 contains similar elements of FIG. 2 except that FIG. 3 includes an operating system 328 and a lock 330. The description of similar elements in FIG. 2 is incorporated here in FIG. 3. The operating system 328 is executed on the central computing unit 304. In one embodiment, the operating system 328 includes the lock 330. In another embodiment, the lock 330 exists outside the operating system 328 or outside of the integrated circuit $300_0$.

The lock 330 secures the resource 316 for the exclusive use of a processor. In an exemplary embodiment, the processor $300_1$ needs to access the resource 316 to use a portion of the data structure 318. The processor $300_1$ requests the lock 330 for exclusive access to the resource 316. If the lock 330 has not secured the resource 316 for another entity to use, it locks the resource 316 to the exclusive use of the processor $300_1$. Other processors that request to use the resource 316, such as processor $300_2$, wait until the resource 316 is again made available by the lock 330.

At least a portion of the fast memory $322_1$ may be reset when the processor $300_1$ has exclusive access to the resource 316. For illustrative purposes only, suppose the processor $300$ uses the data structure 318 repeatedly, the fast memory $322_1$ stores a copy of at least a portion of the data structure 318 to reduce bandwidth usage and memory latency. Once the processor $300_1$ no longer needs to use the data structure 318, it informs the lock 330 to unlock the resource 316 for other entities to use.

For further illustrative purposes, suppose the processor $300_2$ requests exclusive access to the resource 316. Since the resource 316 is available, the processor $300_1$ obtains a lock to the data structure 318 for its exclusive use. A portion of the primary fast memory $322_2$ of processor $300_2$ is selectively reset. In one embodiment, the portion of the memory is reset every time. In another embodiment, the portion of the memory is reset if a certain condition is satisfied; one condition, for example, may include instances where a different processor than processor $300_2$ had exclusive use of the resource 316. Processor $300_2$ then makes changes to the data structure 318. Once the processor $300_2$ no longer needs the data structure 318, it informs the lock 330 to unlock the resource 316.

Next, for further illustrative purposes, suppose the processor $300_1$ again requests exclusive access to the resource 316 to use a portion of the data structure 318. Processor $300_1$ obtains the lock since no other processor is using the data structure 318. Processor $300_1$ then proceeds to access the portion of the data structure 318. But it has a copy of at least a portion of the data structure 318 in its primary fast memory $322_1$ already. However, this copy of the portion of the data structure 318 is not the same as the portion of the data structure 318 in resource 316. The data structure 318 in resource 316 may have been changed previously by processor $300_2$. In one embodiment, at least a portion of the fast memory $322_1$ is reset so that the processor $300_1$, instead of using the copy of the data structure 318 in its primary fast memory $322_1$, would have to again access the data structure 318 from resource 316. In another embodiment, all of the fast memory $322_1$ is reset. The fast memory $322_1$ is reset if another processor had access to the fast memory $322_1$ since the last time processor $300_1$ had access to the fast memory $322_1$.

In one embodiment, the lock 330 is a hardware register. In another embodiment, the lock 330 is a software semaphore. In another embodiment, the lock 330 is a binary semaphore. In another embodiment, the lock 330 is a counting semaphore.

Figure 4:
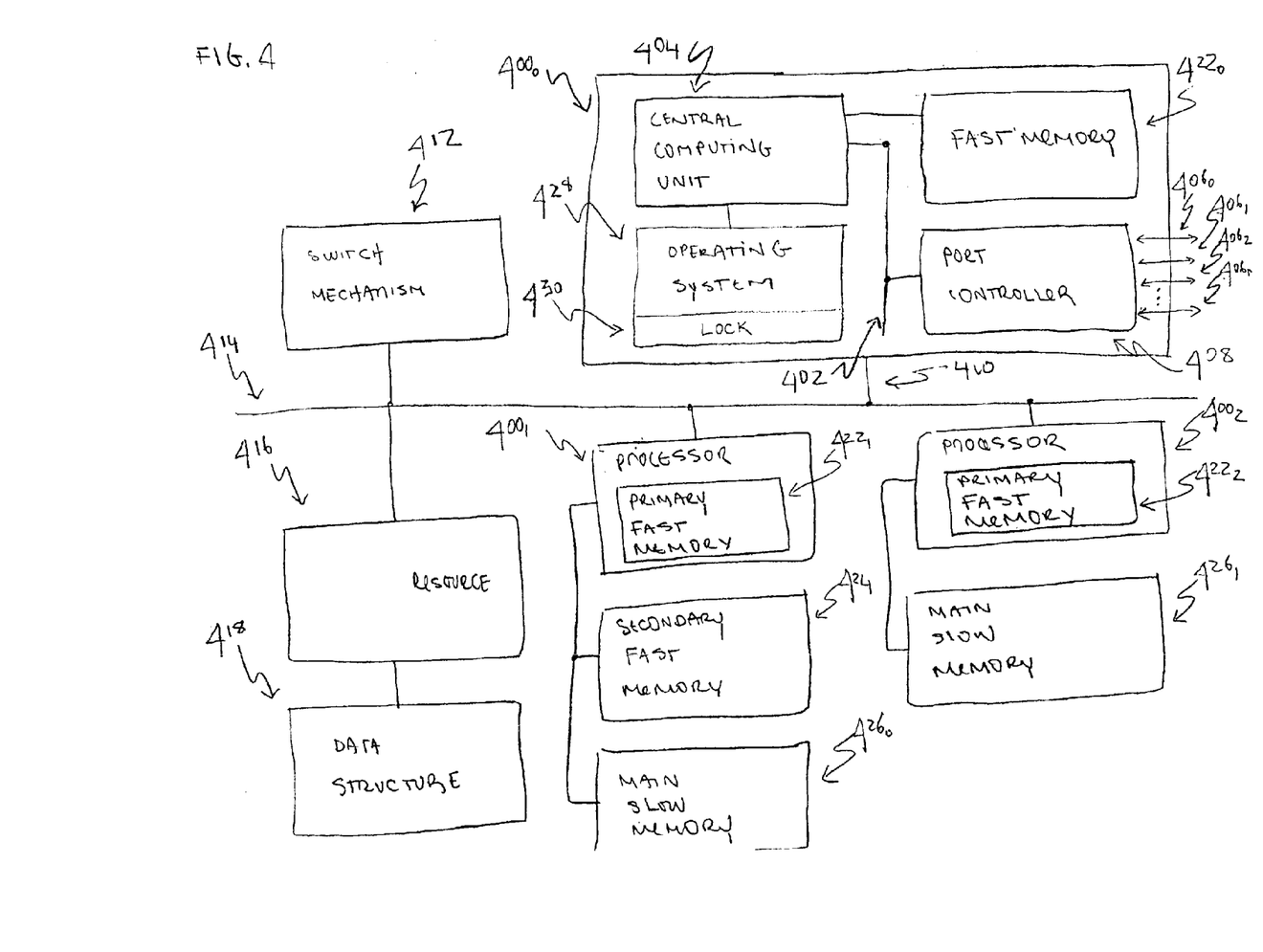
FIG. 4 is a block diagram illustrating a system in accordance with one embodiment.

FIG. 4 is a block diagram illustrating a system in accordance with one embodiment. FIG. 4 contains similar elements of FIG. 3 and FIG. 2. The description of similar elements is incorporated here in full. FIG. 4 contains together the switching mechanism 412 and the lock 430. The switching mechanism 412 may operate differently than as described heretofore.

In an illustrative embodiment, suppose the processor $400_1$ needs to use a portion of the data structure 418. The processor $400_1$ requests the switching mechanism 412 to grant control of the resource 416. If the switching mechanism 412 has not granted control to another processor, the switching mechanism 412 switches control to the processor $400_1$. While the processor $400_1$ has control, the switching mechanism 412 denies access to other processors that request similar control, such as processor $400_2$. Once the processor $400_1$ obtains control of the resource 416, it communicates with the switching mechanism 412 that it has control; the switching mechanism then again allow other processors to request control to the resource 416. Thus, the function of the switching mechanism 412 can be likened to a global switch.

After eliminating contention access from other processors, the processor 400 verifies with the lock 430 to determine whether the data structure 418 has actually been locked. In one embodiment, the lock 430 may reside within the data structure 418.

If the data structure 418 has not been locked, the processor $400_1$ obtains the lock. At least a portion of the fast memory $422_1$ may be reset when the processor $400_1$ has access to the data structure 418. For illustrative purposes, suppose the processor $400_1$ uses the data structure 418 repeatedly, the fast memory $422_1$ stores a copy of at least a portion of the data structure 418. From then on, the processor $400_1$ uses the copy of the data structure 418 unless changes are made to the data structure 418. Once the processor $400_1$ no longer needs to use the data structure 418, it informs the lock 430 and releases the lock 430 on the data structure 418.

For further illustrative purposes, suppose the processor $400_2$ requests control of the data structure 418 white the data structure 418 is locked by processor $400_1$. Since the switching mechanism 412 has not allocated that control, the processor $400_2$ obtains control. The processor $400_2$ proceeds to lock the data structure 418. However, since the data structure 418 has already been locked by processor $400_1$ the attempt by the processor $400_2$ to lock the data structure 418 is denied. The processor $400_2$ then releases control to the switching mechanism 412, other processors then attempt to grab control, and the processor $400_2$ waits for its chance to gain control again.

For further illustrative purposes, suppose subsequently that the processor $400_2$ obtains control and gains access to the data structure 418 when the processor $400_1$ releases the lock on the data structure 418. A portion of the primary fast memory $422_2$ of processor $400_2$ is selectively reset. In one embodiment, the memory is reset every time. In another embodiment, the memory is reset when a certain condition is satisfied; one condition, for example, may include instances where a different processor than processor $400_2$ had exclusive use of the resource 416. Processor $400_2$ then makes changes to the data structure 418. Once the processor $400_2$ no longer needs the data structure 418, it releases the lock on the data structure 418.

Next, for further illustrative purposes, suppose the processor $400_1$ again requests access to the data structure 418 through the above-described process. Processor $400_2$ is granted access since no other processor is using the data structure 418. Processor $400_1$ then proceeds to access the data structure 418. But it has a copy of at least a portion of the data structure 418 in its primary fast memory $422_1$ already. However, this copy of the data structure 418 is not the same as the data structure 418 in resource 416. The data structure 418 in resource 416 may have been modified previously by processor $400_2$. In one embodiment, at least a portion of the fast memory $422_1$ may be reset so that the processor $400_1$, instead of using the copy of the data structure 418 in its primary fast memory $422_1$, would have to again access the data structure 418 from resource 416. In another embodiment, all of the fast memory $422_1$ may be reset. In one embodiment, the lock 430 is a data structure. The fast memory $422_1$ is only reset if another processor had access to memory since the last time processor $400_1$ had access to the fast memory $422_1$.

Figure 5:
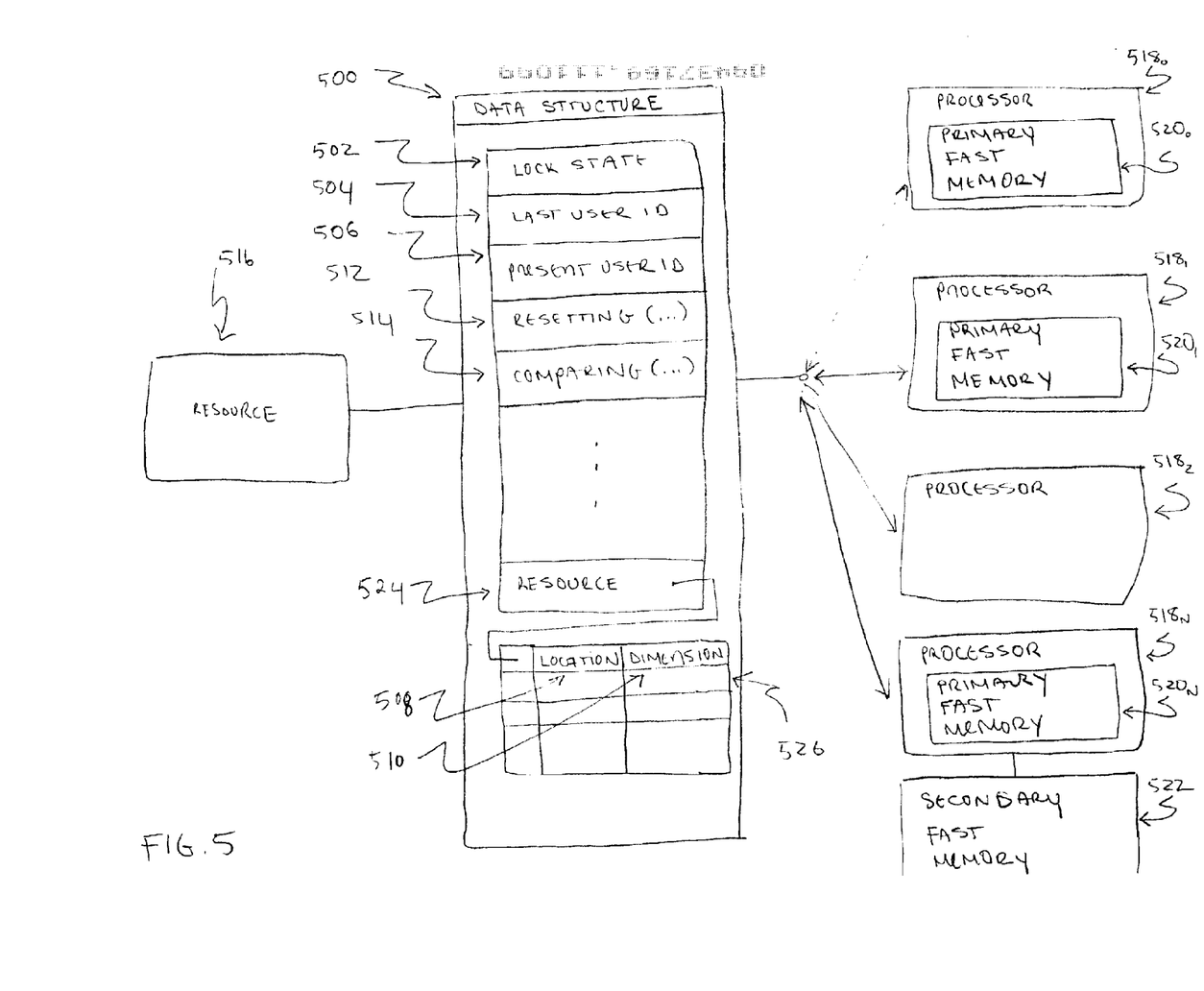
FIG. 5 is a block diagram illustrating a data structure in accordance with one embodiment.

FIG. 5 is a block diagram illustrating a data structure in accordance with one embodiment. Data structure 500 is used to schedule accesses to resource 516. The data structure 500 includes several data variables. The data variable "lock state" 502 contains information about whether the resource 516 has been locked or not. The data variable "last user id" 504 contains information to identify the last processor that accessed the resource 516. The data variable "present user id" 506 contains information to identify the current processor that accesses the resource 516. The data variable "resource" 524 contains at least a location and a dimension of a portion of resource 516 where such is being accessed. In one embodiment, data variable "resource" 524 is a pointer to a list 526 containing at least a location and at least a dimension of a portion of resource 516 where such is being accessed. The data variable "resource location" 508 contains the address of a portion of the resource 516. The data variable "resource dimension" 510 contains the size of a portion of the resource 516. In one embodiment, the list 526 may be implemented as an army data structure. In another embodiment, the list 526 may be implemented as a linked list.

In one embodiment, the data variables "resource location" 508 and "resource dimension" 510 are indicative of the area of the resource that the data structure 500 protects. When control of the access to the resource 516 changes hands from one processor to another, the processor having present access resets the portion of the fast memory that relates to the area indicated by the data variables "resource location" 508 and "resource dimension" 510. In another embodiment, the data variables "resource location" 508 and "resource dimension" 510 are not used; instead, all portions of the fast memory are reset except for the portion storing stack data.

In one embodiment, the data structure 500 is a class. In that embodiment, the data structure 500 further includes a method "resetting" 512. This method is used to reset the fast memory of a processor that has access to the resource 516. This method inhibits cache incoherence so that the processor does not inadvertently use a copy of old data.

In the embodiment where the data structure 500 is a class, the data structure 500 further includes a method "comparing" 514. This method compares the data variables "last user id" 504 and "present user id" 506. If the data variables "last user id" 504 and "present user id" 506 are the same, then the method "resetting" 512 is not executed. If, however, the data variables "last user id" 504 and "present user id" 506 are different, then the method "resetting" 512 may be executed.

Processors $518_0$, $518_1$, $518_2$, ..., and $518_N$ use the data structure 500 for orderly access to resource 516. The data structure 500 ensures that only one processor among processors $518_0$, $518_1$, $518_2$, ..., and $518_N$ may access the resource 516 at any one time. Processors $518_0$, $518_1$, and $518_N$ have primary fast memory $520_0$, $520_1$, and $520_N$, respectively. In one embodiment, the data structure 500 is responsible for cache coherency by resetting at least a portion of the primary fast memory of the processor currently accessing the resource 516. In another embodiment, the processors $518_0$, $518_1$, and $518_N$ are responsible for resetting at least a portion of the primary fast memory $520_0$, $520_1$, and $520_N$, respectively, to ensure cache coherency.

In another embodiment, the processor $518_2$ does not have primary fast memory. In this case, neither the data structure 500 nor the processor $518_2$ needs to reset any primary fast memory.

In another embodiment, the processor $518_N$ has not only the primary fast memory $520_N$ but also secondary fast memory 522. In one embodiment, the data structure 500 would be responsible for resetting at least a portion of the primary fast memory $520_N$ and also at least a portion of the secondary fast memory 522 to ensure cache coherency. In another embodiment, the processor $520_N$ ensures cache coherency by resetting at least a portion of the primary fast memory $520_N$ and at least a portion of the secondary fast memory 522.

Figure 6:
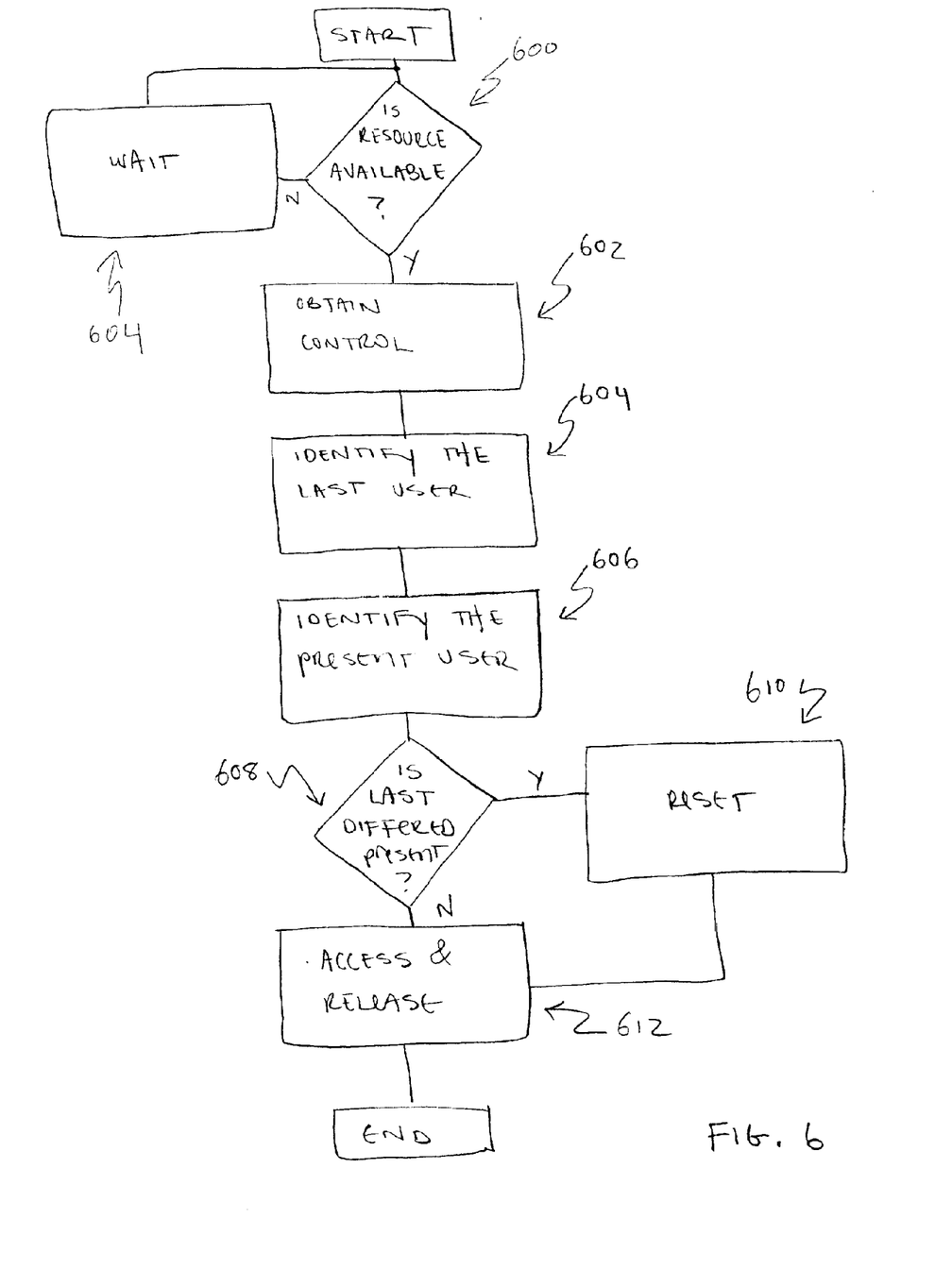
FIG. 6 is a flow diagram illustrating a method for allowing resources to be shared in accordance with one embodiment.

FIG. 6 is a flow diagram illustrating a method for allowing resources to be shared in accordance with one embodiment. In the present embodiment, the entity that requests access to the resource to use it in some way can be a user, a processor, or a software client. For explanatory purposes the processor will be used to describe the following embodiment.

A processor requests access to a resource to do some work. In one embodiment, such work may entail reading from the resource to obtain certain information. In another embodiment, such work may entail writing to the resource to store certain information. In another embodiment, such work may entail both reading and writing. In another embodiment, such work may be to execute certain processes on the resource. In another embodiment, such work may be to control the resource.

The processor begins by checking at block 600 to see if the resource is available. If the resource is not available, the processor then waits at block 604, and subsequently retries to gain access the resource at block 600. If the resource is available, the processor attempts to gain control of the resource at block 602. Obtaining control may include locking the resource for exclusive access and inhibiting others from contending for access.

Next, at block 604, the identity of the last processor that had accessed the resource is obtained. Then, at block 606, the identity of the present processor that has accessed the resource is obtained. At block 608, the identity of the last processor and the identity of the present processor are compared. If the identities are the same, the method goes to block 612. Otherwise, if the identities are different, block 610 resets at least a portion of the cache memory of the processor.

At block 612, the present processor accesses the resource. Once the present processor has finished using the resource, it releases the resource so that other processors may obtain access to it.

CONCLUSION

Thus, systems, devices, structures, and methods have been described to share resources among a plurality of processors. The described embodiments allow resources to be shared without the use of complex bus snooping and cache invalidation hardware. Because this hardware is also expensive, the described embodiments benefit from cost reduction. The present embodiments also enjoy an integrated solution on one chip with a small footprint because it does not use the complicated bus architecture of the bus snooping and cache invalidation hardware.

Although the specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A system comprising:
    a bus;
    a resource coupled to the bus;
    means for identifying a previous owner of the resource; and
    a plurality of entities coupled to the bus, at least one entity among the plurality of entities including a memory, wherein at least a portion of the memory of the at least one entity is selectively reset when the at least one entity has access to the resource, wherein the memory portion is reset if the entity is not the previous owner of the resource, and wherein the memory portion is not reset when the at least one entity is the previous owner of the resource.

2. The system of claim 1, wherein the at least one entity is an integrated circuit.

3. The system of claim 1, wherein the resource includes at least a portion of a memory device.

4. The system of claim 1, further comprising a manager to manage at least one request from the plurality of entities to access the resource.

5. The system of claim 1, further comprising an arbiter coupled to the plurality of entities to arbitrate at least one bus request from the plurality of entities.

6. An integrated circuit for allowing a resource to be controlled by a plurality of processors including a first and second processor, wherein the first processor includes a fast memory, the integrated circuit comprising:
    a bus;
    a central computing unit coupled to the bus; and
    a switch mechanism, coupled to the central computing unit, to switch the control of the resource, wherein a portion of the fast memory of the first processor is reset when the control of the resource is switched to the second processor and not reset when control of the resource remains with the first processor.

7. The integrated circuit of claim 6, wherein the switch mechanism is a hardware device.

8. The integrated circuit of claim 6, wherein the switch mechanism is a software switch.

9. The integrated circuit of claim 8, wherein the software switch is a Djikstra primitive.

10. The integrated circuit of claim 6, wherein the at least one resource is a hardware resource.

11. The integrated circuit of claim 10, wherein the hardware resource is a memory.

12. The integrated circuit of claim 6, further comprising a communications channel controller coupled to the bus.

13. The integrated circuit of claim 6, wherein the at least one resource is a software resource.

14. The integrated circuit of claim 13, wherein the software resource is a data structure.

15. The integrated circuit of claim 6, wherein the fast memory is cache memory.

16. An integrated circuit for allowing a resource to be shared by a plurality of processors, including a first and second processor, wherein the first processor includes a fast memory, the integrated circuit comprising:
    a bus;
    a central computing unit coupled to the bus; and
    a lock coupled to the central computing unit to reserve exclusive control of the resource, wherein a portion of the fast memory of the first processor is reset when the second processor obtains exclusive control of the resource from the first processor and not reset when exclusive control remains with the first processor.

17. The integrated circuit of claim 16, wherein the lock is a hardware register.

18. The integrated circuit of claim 16, wherein the lock is a software semaphore.

19. The integrated circuit of claim 18, wherein the software semaphore is a binary semaphore.

20. The integrated circuit of claim 16, further comprising a communications channel controller coupled to the bus.

21. The integrated circuit of claim 16, wherein the fast memory is cache memory.

22. The integrated circuit of claim 21, wherein the cache memory is primary cache memory.

23. The integrated circuit of claim 21, wherein the cache memory is secondary cache memory.

24. A data structure in a machine-readable medium for allowing a resource to be shared among a plurality of processors, at least one processor of the plurality of processors including a fast memory, the data structure is a class, comprising:
   a state for indicating that the resource is under control;
   a first identifier for identifying a past processor that had exclusive control of the resource; and
   a second identifier for identifying a present processor that has exclusive control of the resource;
   means for comparing the first identifier to the second identifier; and
   means for resetting at least a portion of the fast memory of the present processor when the first identifier does not match the second identifier.

25. The data structure of claim 24, wherein the fast memory is cache memory.

26. The data structure of claim 24, further comprising a data type that is adapted to represent at least one portion of the resource, wherein the data type includes at least one location of the at least one portion of the resource and at least one dimension of the at least one portion of the resource.

27. The data structure of claim 24, further comprising a list that includes at least one location of at least one portion of the resource and at least one dimension of at least one portion of the resource.

28. A method for allowing at least one resource to be shared among a plurality of processors, the method comprising:
   obtaining exclusive control over the at least one resource by a present processor, the present processor including a fast memory;
   identifying a past processor to obtain a first identity, wherein the past processor had exclusive control over the at least one resource;
   identifying a present processor to obtain a second identity, the present processor having exclusive control over the at least one resource;
   comparing the first identity and the second identity so as to determine if the present processor is different from the past processor; and
   resetting a portion of the fast memory of the present processor when the past processor is different from the present processor and not resetting a portion of the fast memory of the present processor when the past processor is the same as the present processor.

29. The method of claim 28, wherein identifying the present processor further comprises the fast memory as cache memory.

30. The method of claim 28, wherein the progression of the method is in the order presented.

31. A method for scheduling access to a resource from among a plurality of processors, the method comprising:
   obtaining access to the resource by a requesting processor, the requesting processor including a cache memory;
   excluding access to the resource from the plurality of processors except for the requesting processor; and
   resetting a portion of the cache memory of the requesting processor when the requesting processor is different from a processor that previously had access to the resource, and not resetting a portion of the cache memory of the requesting processor when the requesting processor is the same as a processor that previously had access to the resource.

32. An integrated circuit for allowing a resource to be controlled by a plurality of processors, including a first and second processor, wherein the first processor includes a fast memory, the integrated circuit comprising:
   a bus;
   a central computing unit coupled to the bus;
   a switch mechanism for switching the control of the resource; and
   a lock, in a cooperative relationship with the, switching mechanism, for reserving exclusive control of the resource to the first processor, wherein at least a portion of the fast memory of the first processor is reset when the second processor obtains exclusive control of the resource and not reset when the exclusive control of the resource remains with the first processor.

33. The integrated circuit of claim 32, wherein the fast memory is cache memory.

34. The integrated circuit of claim 32, further comprising a communications channel controller coupled to the bus, wherein the communications channel controller is receptive to diverse communications protocols.

35. The integrated circuit of claim 32, wherein the cooperative relationship of the switch mechanism and the lock maintains cache coherency.

36. An integrated circuit for allowing a resource to be controlled by a plurality of processors, including a first and second processor, wherein the first processor includes a fast memory, the integrated circuit comprising:
   a bus;
   a central computing unit coupled to the bus; and
   a scheduler, coupled to the central computing unit, for scheduling the control of the resource, wherein a portion of the fast memory of the first processor is reset when the resource becomes under the control of the second processor and not reset when the resource remains under the control of the first processor.

37. A system comprising:
   a bus;
   a resource coupled to the bus;
   a plurality of processors coupled to the bus including a first and second processor, wherein the first processor includes a fast memory; and
   a switch mechanism, coupled to the bus, to switch the control of the resource, wherein a portion of the fast memory of the first processor is reset when the control of the resource is switched to the second processor and not reset when control of the resource remains with the first processor.

38. The system of claim 37, wherein the switch mechanism is a hardware device.

39. The system of claim 37, wherein the switch mechanism is a software switch.

40. The system of claim 39, wherein the software switch is a Djikstra primitive.

41. The system of claim 37, wherein the at least one resource is a hardware resource.

42. The system of claim 41, wherein the hardware resource is a memory.

43. The system of claim 37, wherein the at least one processor includes a communications channel controller.

44. The system of claim 37, wherein the at least one resource is a software resource.

45. The system of claim 44, wherein the software resource is a data structure.

46. The system of claim 37, wherein the fast memory is cache memory.

47. A system comprising:
a bus;
a resource coupled to the bus;
a plurality of processors coupled to the bus including a first and second processor, wherein the first processor includes a fast memory; and
a lock to reserve exclusive control of the resource, wherein a portion of the fast memory of the first processor is reset when the second processor of the plurality of processors obtains exclusive control of the resource from the first processor and not reset when exclusive control of the resource remains with the first processor.

48. The system of claim 47, wherein the lock is a hardware register.

49. The system of claim 47, wherein the lock is a software semaphore.

50. The system of claim 49, wherein the software semaphore is a binary semaphore.

51. The system of claim 47, further comprising a communications channel controller coupled to the bus.

52. The system of claim 47, wherein the fast memory is cache memory.

53. The system of claim 52, wherein the cache memory is primary cache memory.

54. The system of claim 52, wherein the cache memory is secondary cache memory.

55. A system comprising:
a bus;
a resource coupled to the bus;
a plurality of processors coupled to the bus including a first and second processor, wherein the first processor includes a fast memory;
a switch mechanism to switch the control of the resource; and
a lock, in a cooperative relationship with the switching mechanism, to reserve exclusive control of the resource to a first processor, wherein at least a portion of the fast memory of the first processor is reset when the second processor obtains exclusive control of the resource and not reset when the exclusive control of the resource remains with the first processor.

56. The system of claim 55, wherein the fast memory is cache memory.

57. The system of claim 55, wherein the at least one processor includes a communications channel controller, wherein the communications channel controller's receptive to diverse communications protocols.

* * * * *

UNITED STATES PATENT AND TRADEMARK OFFICE
CERTIFICATE OF CORRECTION

PATENT NO. : 6,886,063 B1
DATED : April 26, 2005
INVENTOR(S) : Rustad

It is certified that error appears in the above-identified patent and that said Letters Patent is hereby corrected as shown below:

Title page,
Item [56], References Cited, OTHER PUBLICATIONS, "The Computer Language Company" reference, delete "http://ww.techweb.com" insert -- http://www.techweb.com --, therefor.

Column 2,
Line 58, after "entity" delete ",".

Column 3,
Lines 24, 64 and 65, delete "200," and insert -- $200_0$ --, therefor.
Line 29, after "$222_0$" delete ",".

Column 5,
Line 19, delete "ropy" and insert -- copy --, therefor.
Line 43, delete "222," and insert -- $222_1$ --, therefor.

Column 6,
Line 8, delete "3001" and insert -- $300_2$ --, therefor.

Column 7,
Line 2, delete "400" and insert -- $400_1$ --, therefor.
Line 19, after "418" delete "white" and insert -- while --, therefor.
Line 24, delete "$400_1$" and insert -- , --.
Line 46, delete "$400_2$" and insert -- $400_1$ --, therefor.

Column 8,
Line 16, delete "army" and insert -- array --, therefor.

Column 12,
Line 25, after "the" delete ",".

UNITED STATES PATENT AND TRADEMARK OFFICE
CERTIFICATE OF CORRECTION

PATENT NO. : 6,886,063 B1
DATED : April 26, 2005
INVENTOR(S) : Rustad

It is certified that error appears in the above-identified patent and that said Letters Patent is hereby corrected as shown below:

<u>Column 14,</u>
Line 31, delete "controller's" and insert -- controller is --, therefor.

Signed and Sealed this

Thirtieth Day of August, 2005

JON W. DUDAS
*Director of the United States Patent and Trademark Office*